(12) United States Patent
Philippi

(10) Patent No.: US 8,073,315 B2
(45) Date of Patent: Dec. 6, 2011

(54) RADIANT HEATER FOR HEATING THE BUILDING MATERIAL IN A LASER SINTERING DEVICE

(75) Inventor: Jochen Philippi, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 917 days.

(21) Appl. No.: 11/792,469

(22) PCT Filed: Apr. 28, 2006

(86) PCT No.: PCT/EP2006/003991
§ 371 (c)(1),
(2), (4) Date: Feb. 11, 2008

(87) PCT Pub. No.: WO2006/125507
PCT Pub. Date: Nov. 30, 2006

(65) Prior Publication Data
US 2008/0131104 A1 Jun. 5, 2008

(30) Foreign Application Priority Data
May 26, 2005 (DE) .................. 10 2005 024 790

(51) Int. Cl.
*A45D 20/40* (2006.01)
(52) U.S. Cl. ................ 392/407; 392/411; 392/416
(58) Field of Classification Search .................. None
See application file for complete search history.

(56) References Cited

U.S. PATENT DOCUMENTS

| 4,818,562 A | 4/1989 | Arcella et al. |
| 5,155,321 A | 10/1992 | Grube et al. |
| 2004/0074898 A1 | 4/2004 | Mariner et al. |

FOREIGN PATENT DOCUMENTS

| CN | 2152471 Y | 1/1994 |
| CN | 2189371 Y | 2/1995 |
| EP | 0470705 A2 | 2/1992 |
| EP | 0 632 479 A1 | 6/1994 |
| WO | 92/08566 A1 | 5/1992 |
| WO | 96/29192 A1 | 9/1996 |
| WO | WO2002042240 A2 | 5/2002 |

OTHER PUBLICATIONS

Franco and Shanafield, Thermal Conductivity of Polycrystalline Aluminum Nitride (AlN) Ceramics, Ceramica, 50, 2004, pp. 274-253 (English).
Homepage Azomaterials-Graphite (C)-Classifications, Properties and Applications of Graphite (English) (www.azomaterials.com/details.asp?articleid=1630) (Sep. 10, 2002).
NSM Archive, AlN-Aluminium Nitride—Thermal Properties, Ioffe Physical Technical Institute, St. Petersburg, Russia (English).
Pajkic et al., Leitfähige Bakelite-Kohlenstoffkurzfaser-Verbundstoffe, Uni Beyreuth, Apr. 6, 2009 (German).

*Primary Examiner* — Thor S Campbell
(74) *Attorney, Agent, or Firm* — McDonnell Boehnen Hulbert & Berghoff LLP

(57) ABSTRACT

A radiant heating for heating the building material in a laser sintering device and a laser sintering device having such a radiant heating are described. The radiant heating has a sheet-like heat radiating element (113, 213, 313), which is characterized in that it is made of a material, that has a low thermal inertia with a thermal diffusivity of preferably more than $1.5 \cdot 10^{-4}$ m²/s and preferably has a thickness of 2 mm or less.

12 Claims, 5 Drawing Sheets

RADIANT HEATER FOR HEATING THE BUILDING MATERIAL IN A LASER SINTERING DEVICE

BACKGROUND OF THE INVENTION

The present invention is related to a radiant heating and to a laser sintering device having such a radiant heating.

Such a radiant heating and such a laser sintering device for the manufacturing of a three-dimensional object are known from WO 92/08566.

A resistive heating element made of graphite in order to process semiconductor wafers at temperatures up to 1200° C. is known from US 2004/0074898 A1. The thickness of the resistive element in such a case is 0.1 inch (2.54 mm) or more. Due to the high thickness of the resistive heating element its thermal inertia is high. In particular at lower temperatures no fast temperature control or adjustment is possible with it.

When manufacturing a three-dimensional object by subsequently solidifying layers of a powder material by a laser beam the temperature of the material has to be within a certain process window in order to ensure a good quality of the three-dimensional object. For a fast and exact adjustment/control of this temperature the dynamic behavior of the radiant heating is decisive.

BRIEF SUMMARY OF THE INVENTION

Therefore, the object of providing a radiant heating for a laser sintering device and providing a laser sintering device having such a radiant heating, by which the temperature of the material can be adjusted/controlled in a fast and exact way, forms the basis of the invention.

The object is achieved by a radiant heating and by a laser sintering device for manufacturing of a three-dimensional object according to the claims.

Compared to the use of conventional radiant heaters such as lamps or heating rods the use of a panel radiator in a laser sintering device has the advantage that it can be operated at the same radiated power at lower temperatures. This leads to less lateral radiation to the walls of the process chamber and to a cooler atmosphere in the process chamber.

The inventive radiant heating has the particular advantage that it has a heat radiating element having a lower thermal inertia. Therefore, the power emitted by the heat radiating element can be quickly changed. This allows for a fast and exact adjustment/control of the temperature of the material that is heated by the radiant heating.

Moreover, due to the invention the manufacturing of a three-dimensional object of a high quality at a short building time is possible.

The use of graphite for the inventive heat radiating element has the advantage that graphite has a high heat conductivity and at the same time has a low specific heat capacitance. This corresponds to a high thermal diffusivity a, which can be calculated from the specific thermal conductivity λ, the specific density ρ and the specific heat capacity c according to the following equation:

$$a = \lambda/(\rho \cdot c).$$

A high thermal diffusivity is accompanied by a low thermal inertia and a homogeneous temperature distribution or radiant power of the heat radiating element. Further, graphite has the advantage that it can be used at high temperatures.

Further features and the usefulness of the invention will arise from the description of embodiments on the basis of the accompanying drawings.

DETAILED DESCRIPTION OF THE INVENTION

Figure 1:
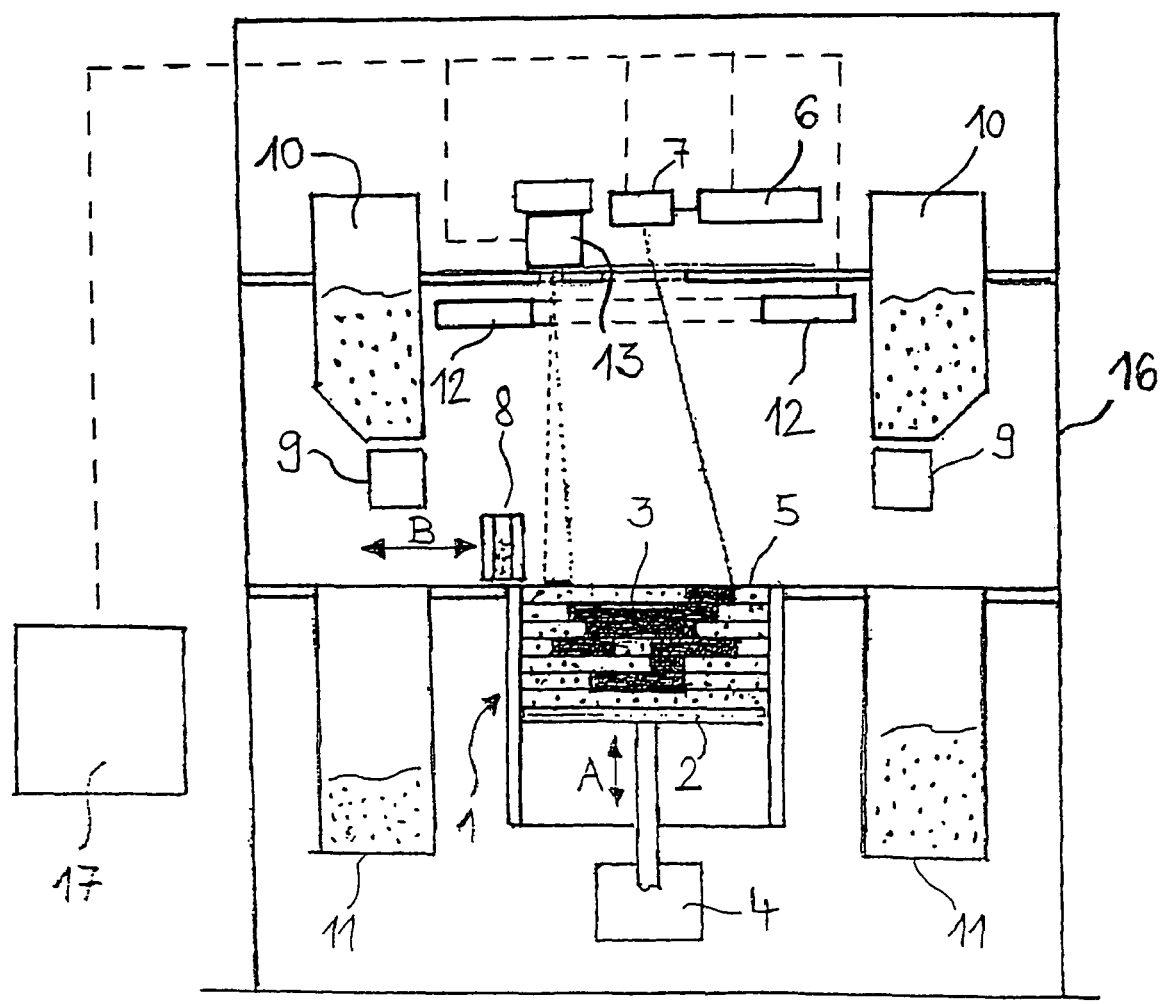
FIG. 1 shows a schematic diagram of an example of the laser sintering device.

FIG. 1 shows a laser sintering device having the inventive radiant heating. The laser sintering device comprises a container 1, which is open to the top. A support 2 for supporting the object 3 to be formed is provided in the container 1. The support 2 can be moved up and down in the container 1 in a vertical direction A by means of a drive 4. The upper edge of the container 1 defines a work plane 5. An irradiation device 6, which is a laser, is positioned above the work plane 5 and emits a directed laser beam that is deflected onto the work plane 5 by a deflection device 7. Moreover, an application device 8 is provided for applying a layer of a powder material to be solidified onto the surface of the support 2 or a previously solidified layer. The application device can be moved back and forth across the work plane 5 by means of a drive that is schematically indicated by the arrows B. The application device 8 is fed from two powder reservoirs 10 by means of two dosing devices 9 at the left and at the right of the construction field. Furthermore, two spill-over containers 11 are provided at the left and at the right of the construction field, which can take up the excess powder that accumulates during the powder application.

Furthermore the device comprises a radiant heating 12, which is located above the work plane 5, for pre-heating an applied powder layer, which has not yet been sintered, up to a work temperature $T_A$ suitable for sintering. The radiant heating 12 is constructed such that the applied powder layer may be heated uniformly.

Above the work plane 5 a temperature measuring device 13 is provided at a distance, which serves for a non-contact measuring of the temperature of the previously applied or uppermost powder layer.

The work area is secluded from the surrounding by a process chamber 16. Thereby the oxidation of the powder and the release of possible process gases can be prevented, if necessary.

A control and/or adjustment device 17 serves for controlling and/or adjusting the power of the radiant heating 12 as well as the power of the irradiation device 6. For that purpose the control and/or adjustment device 17 is connected to the radiant heating 12, the temperature measuring device 13 and to the irradiation device 6.

Figure 2:
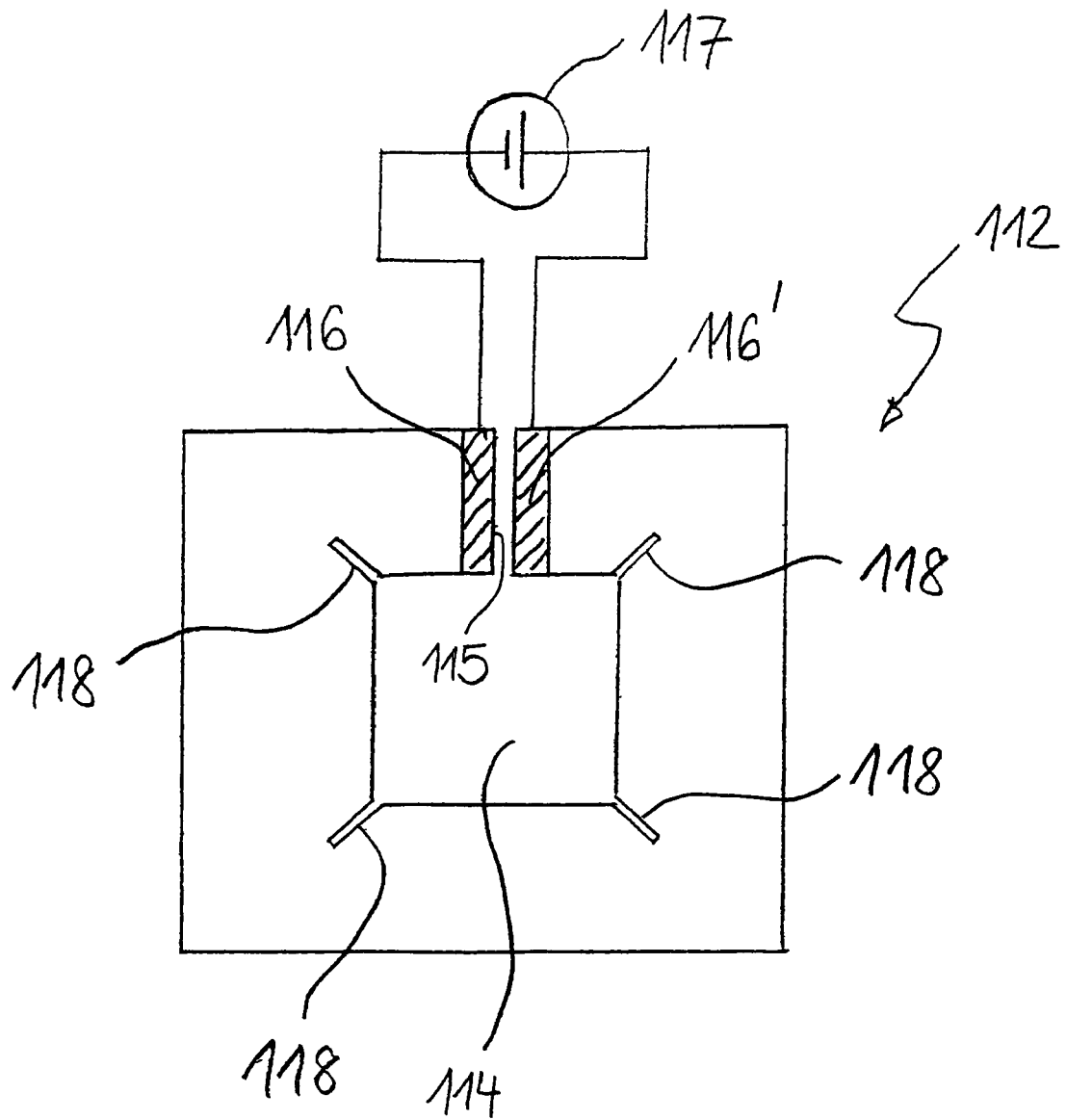
FIG. 2 shows a radiant heating according to a first embodiment.

FIG. 2 shows a first embodiment of the radiant heating.

The radiant heating 112 according to the first embodiment comprises a resistive element 113 as heat radiating element. The resistive element 113 is formed of a graphite plate (e.g. carbon fiber reinforced graphite plate ®SigraBond of SGL Carbon) having a thermal diffusivity $a > 1.5 \cdot 10^{-4}$ m$^2$/s at a temperature of 20° C. and a thickness of d=2.0 mm. It substantially has the shape of a rectangle with a rectangular opening 114 for the laser beam and the optical path of the temperature measuring device being positioned at the center.

The resistive element surrounding the rectangular opening is interrrupted at the periphery by means of a gap 115. On both sides of the gap a contact 116 and 116', respectively, which in each case is designed as a copper bar, is attached to the resistive element. A controllable voltage supply 117 that is designed for high currents (approximately 20-40 A at a voltage of 30-60 V) is connected to the contacts 116, 116'. Slits 118 are extending from the corners of the opening 115 towards the corners of the outer periphery of the resistive element in order to achieve a more homogeneous distribution of the current density and an increase of the heating power in the area of the outer corners, respectively, as soon as a voltage is applied to the contacts 116, 116' in the resistive element.

In the following the operation of the previously described laser sintering device and the inventive radiant heating will be described.

At first, a first powder layer is applied onto the support 2 by means of the application device 8.

It is particularly important for the quality of the finished object that the temperature of the uppermost powder layer to be solidified is a temperature within a predetermined range that is the process window. Above of this process window the powder is already sintered without additional radiation energy, while at temperatures below the process window warping may occur in the solidified layer. Often the so-called curl effect, wherein the edges of the solidified layer bend up or roll up, is also attributed to a too low temperature of the uppermost powder layer. Therefore, in order to achieve good results, in particular to prevent warpage in the manufactured object, before the solidification the powder layer applied by the application device must be heated by the radiant heating 12 up to a work temperature $T_A$ within the process window.

For this purpose after the application of the powder layer the temperature of this layer is measured without contact by the temperature measuring device 13. Depending on the temperature measured thereby the heating power of the radiant heating 12 is determined. After the uppermost powder layer has been heated up to the work temperature $T_A$, the positions in the powder layer corresponding to the cross-section of the object are solidified by irradiation with the laser.

After the solidification of a layer the support 2 is lowered by a distance corresponding to the layer thickness and a new powder layer is applied onto the previously irradiated layer by means of the application device 8. Then the previously described steps are repeated until the manufacturing of the three-dimensional object is completed.

Figure 3:
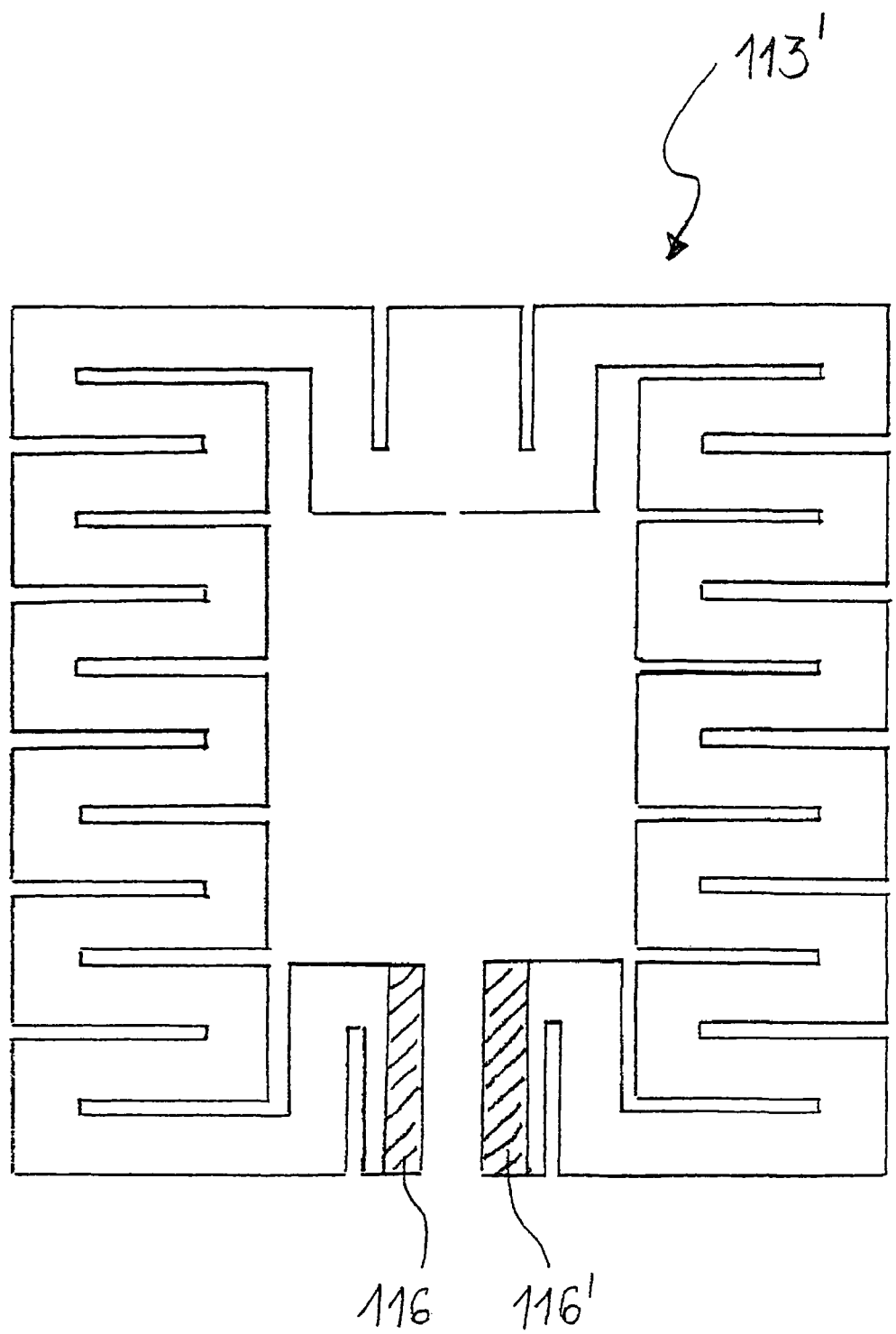
FIG. 3 shows a modification of the radiant heating from FIG. 2.

In FIG. 3 a modification of the first embodiment is shown. A heat radiating element 113' according to this modification differs from the heat radiating element shown in FIG. 2 in that it comprises meander-shaped area paths, by which the value of ohmic resistance—and thereby the heating power for a certain voltage applied to the resistive element—can be increased.

Figure 4:
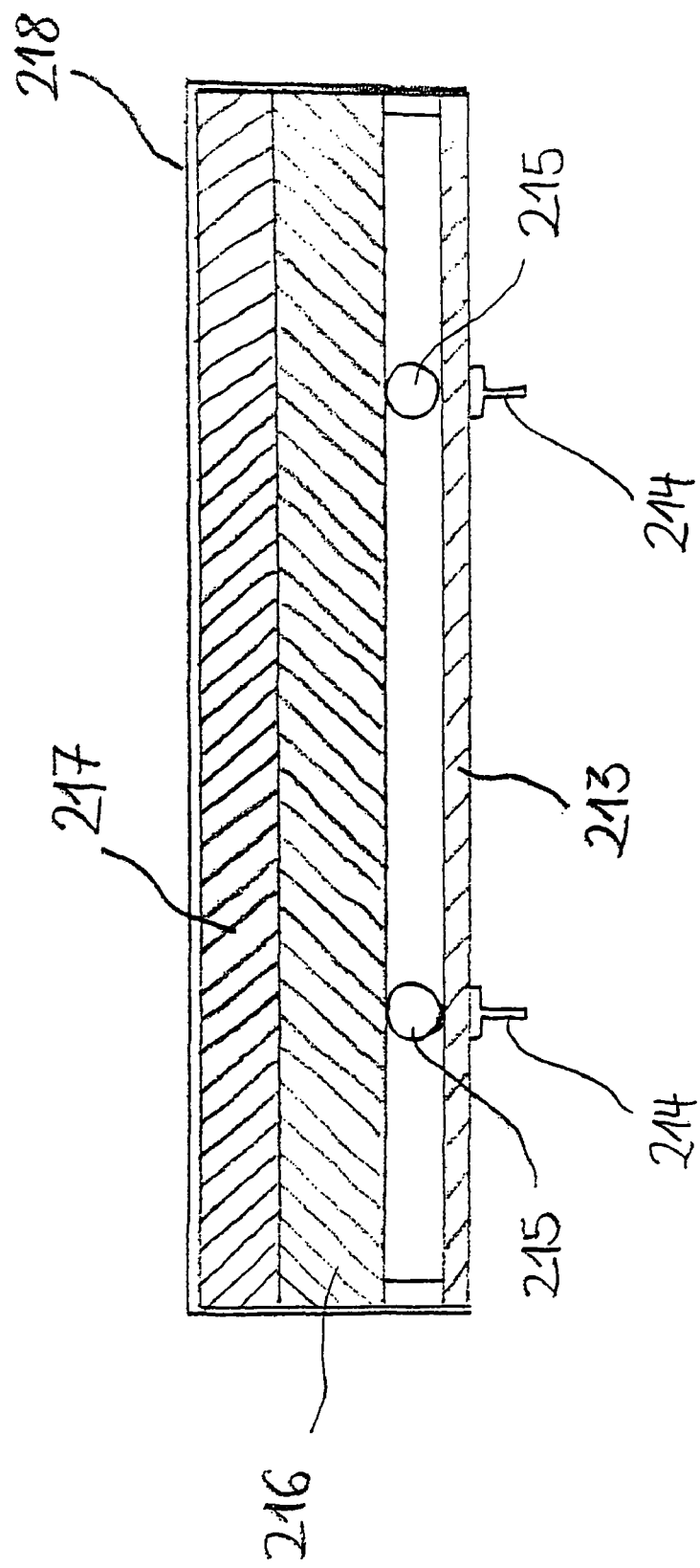
FIG. 4 shows a radiant heating according to a second embodiment.

In FIG. 4 a cross-section of a second embodiment of the inventive radiant heating is shown.

In the radiant heating 212 according to the second embodiment a graphite foil 213 (e.g. ®Sigraflex graphite foil from SGL Carbon) is provided as heat radiating element, which has a thermal diffusivity of $a=2.14 \cdot 10^{-4}$ m$^2$/s at a temperature of 20° C. in a direction parallel to the foil and which has a thickness of d=0.5 mm.

In order to achieve a high emission coefficient the graphite foil 213 is treated with a blackbody spray. It is pressed against a heating wire 215 by means of thin rigid profiled bars 214, so that a good thermal contact is formed between the heating wire 215 and the graphite foil 213. Moreover, the profiled bars contribute to the mechanical stability of the graphite foil.

At the side of the heating wire 215 facing away from the graphite foil a first insulation 216 is provided, which has a bottom side that is reflective for heat radiation. A material having high mechanical stability is selected as material for the first insulation. Preferably this first insulation 216 is made of graphite rigid felt (e.g. ®SigraTherm Graphite Rigid Felt of SGL Carbon) having a low heat conductivity (the thermal conductivity λ of ®SigraTherm Graphite Rigid Felt is lower than 0.3 W/mK at temperatures below 1000° C.).

At the side of the first insulation 216 facing away from the heating wire 215 a second insulation 217 is provided. This second insulation need not have mechanical stability, however, must have good heat insulating characteristics. Preferably the second insulation is made of a material having a heat conductivity λ=0.03 W/mK or less at temperatures below 400° C. (e.g. ®Promalight of Proma).

At the side facing away from the graphite foil and at the lateral sides of the first and second insulations are surrounded by a stainless steel frame 218 at which also the profiled bars 214 are mounted. Also, in order to achieve mechanical stabilisation, spacers 218 of an insulating material are provided laterally between the graphite foil and the first insulation 216.

Figure 5:
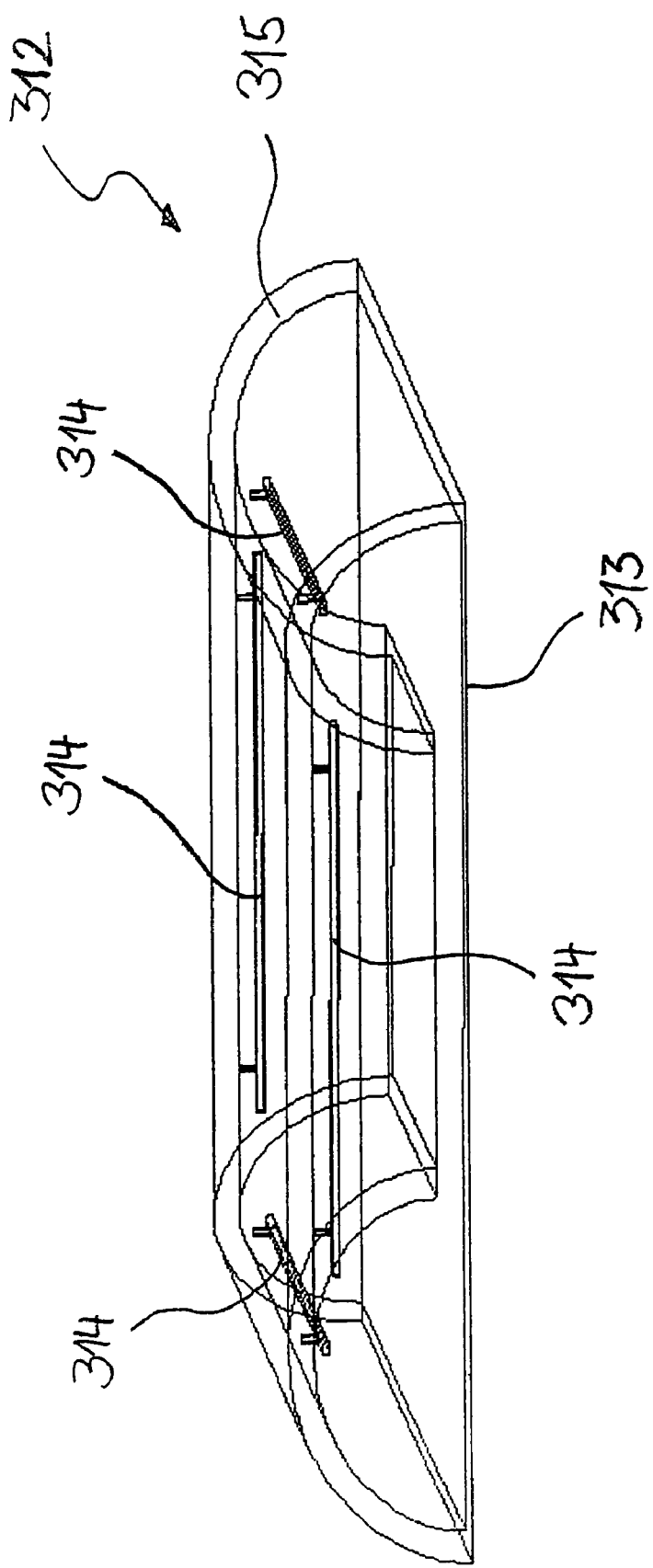
FIG. 5 shows a radiant heating according to a third embodiment.

FIG. 5 shows a third embodiment of the inventive radiant heating.

As it was the case in the second embodiment, in the radiant heating 312 according to the third embodiment a graphite foil 313 is provided as heat radiating element. However, differing from the second embodiment, this graphite foil is not heated by a heating wire, but by IR heat radiators 314, which are positioned at a distance on one side of the graphite foil. Laterally and at the side facing away from the graphite foil the IR heat radiators 314 are surrounded by an insulating shell 315 with a distance inbetween. The insulating shell is characterized in that it is reflective for heat radiation towards the side of the IR radiators and that it has preferably low heat conductivity. Like the heat insulation consisting of the first and second insulation in the second embodiment, the insulating shell 315 may have a multi-layer construction in order to combine a mechanical stability with good insulating characteristics at the same time.

Alternatives and modifications of the above-described laser sintering device, radiant heating and the above-described method are possible.

The inventive radiant heating was described to comprise a heat radiating element having a shape with a rectangular outline. This geometry of the heat radiating element is particularly suited for a uniform heating of a rectangular target field. However, the shape of the heat radiating element is not limited to this, but may have any arbitrary two-dimensional shape that is adapted to the corresponding geometrical proportions. Thus, e.g. the heat radiating element may be formed having a circular outline. Accordingly also the rectangular opening may have a different shape such as a round shape.

It is also possible to provide a plurality of heating zones. Thus, in the radiant heating according to the first embodiment a plurality of resistive heating elements may be provided, in the radiant heating according to the second embodiment a plurality of heating wires may be provided and in the radiant heating according to the third embodiment a plurality of IR heat radiators may be provided, which in each case can be operated independently of each other in order to form a plurality of heating zones that are independent from one another.

In the first embodiment a graphite plate has been described as material of the heat radiating element. The use of a different material is possible as long as the thermal diffusivity has a value above approximately $a=1.5 \cdot 10^{-4}$ m$^2$/s at a temperature of 20° C. In particular, it is also possible to use a graphite foil as heat radiating element like in the second embodiment. If necessary, elements providing mechanical stabilisation have to be provided in case the heat radiating element is not self-supporting. It is e.g. possible to clamp or apply the graphite file onto a grid.

The second embodiment has been described to comprise a heat radiating element being pressed to a heating wire. However, the heating wire can also run within the heat radiation element and in particular within a groove in the heat radiation element. In addition, the heating wire may be sandwiched between two graphite elements by pressing.

In the second and third embodiment the use of a graphite foil as heat radiating element has been described. However, the use of another material having a thermal diffusivity above approximately $a=1.5 \cdot 10^{-4}$ m²/s, preferably above $a=2 \cdot 10^{-4}$ m²/s at 20° C., is also possible. In particular, also a graphite plate can be used.

The different embodiments of the radiant heating have been described having heat radiating elements of a certain thickness. A different thickness, in particular a smaller thickness, is possible. With respect to the thermal characteristics a preferably small thickness is desirable. A lower boundary for the thickness is the mechanical stability.

The invention claimed is:

1. Radiant heating for heating the building material in a laser sintering device comprising a two-dimensional heat radiating element, characterized in that said heat radiating element consists of a material having a thermal diffusivity of more than approximately $1.5 \cdot 10^{-4}$ m²/s at a temperature of 20° C.

2. Radiant heating according to claim 1, wherein the heat radiating element consists of a material having a thermal diffusivity of more than approximately $2 \cdot 10^{-4}$ m²/s at a temperature of 20° C.

3. Radiant heating according to claim 1, wherein the heat radiating element has a thickness of approximately 2 mm or less.

4. Radiant heating according to claim 1, wherein current terminals are provided at the heat radiating element, so that a current can be circulated through the heat radiating element in the direction of the surface in order to operate it as resistive heating element.

5. Radiant heating according to claim 1, wherein a heating wire is provided in contact to the heat radiating element for heating the heat radiating element.

6. Radiant heating according to claim 1, wherein an IR radiant heater is provided for heating the heat radiating element.

7. Radiant heating according to claim 6 further comprising an insulating shell, wherein the radiant heater is included between the insulating shell and the heat radiating element and the insulating shell on its side facing the radiant heater is reflective for the heat that is radiated by the radiant heater.

8. Radiant heating according to claim 4, wherein at least a portion of the heat radiating element is formed in the shape of a meandering sheet-like path.

9. Radiant heating according to claim 5, wherein at least a portion of the heat radiating element is formed in the shape of a meandering sheet-like path.

10. Radiant heating according to claim 1, wherein at one side of the heat radiating element an insulation made of graphite is provided at a distance.

11. Laser sintering device for manufacturing a three-dimensional object by subsequently solidifying layers of a powder material that can be solidified at positions corresponding to the respective cross-section by means of radiation having a radiant heating according to claim 1 for heating the material that can be solidified.

12. Radiant heating according to claim 1, wherein the heat radiating element comprises at the centre an opening for passing the laser beam.

* * * * *